Figure 1:
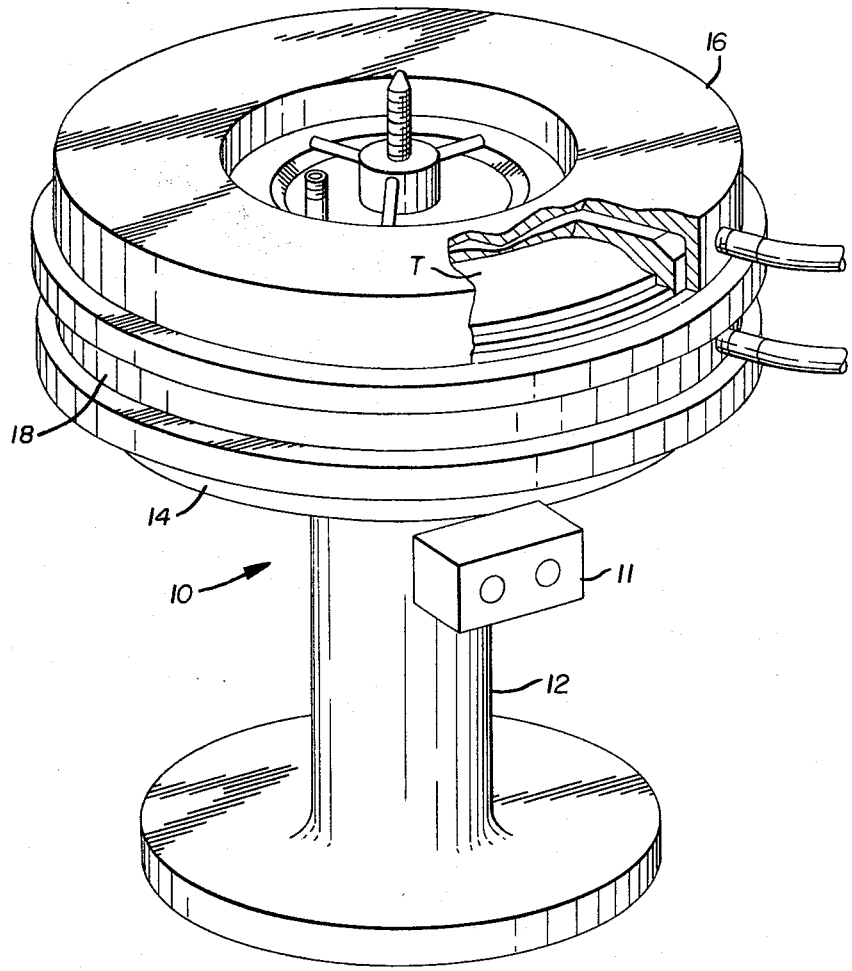

Oct. 11, 1966 K. A. HUTCHINSON 3,277,532
BAGLESS RECAPPING MACHINE

Filed Oct. 8, 1963 3 Sheets-Sheet 1

FIG. I

INVENTOR.
KEITH A. HUTCHINSON
BY
*G. William Freeman*
ATTORNEY

INVENTOR.
KEITH A. HUTCHINSON
BY
J. William Freeman
ATTORNEY

INVENTOR.
KEITH A. HUTCHINSON
BY
*William Freeman*
ATTORNEY

United States Patent Office 3,277,532
Patented Oct. 11, 1966

3,277,532
BAGLESS RECAPPING MACHINE
Keith A. Hutchinson, Akron, Ohio, assignor to Tire Improvement Company, Inc.
Filed Oct. 8, 1963, Ser. No. 314,680
2 Claims. (Cl. 18—18)

This invention relates generally to the art of pneumatic tires, and in particular relates to methods and molds of recapping through which the useable life of a tire may be extended by replacing the tread portion of the tire.

Molding presses and vulcanizing apparatus for the purpose of recapping a pneumatic tire are quite common and varied. In all such presses and apparatus it is necessary for the tire to be subjected to internal pressures in order that the tread portion thereof be driven radially outward into proper registry with the design imparting mold. Obtaining and retaining such proper registry through the length of time involved in a recapping cycle has presented various problems.

In this regard, the best known methods of effectuating such recapping feature the use of curing bags that are placed interiorly of a tire positioned in a molding press, with the introduction of pressure to such bags serving to expand the same against the interior of the tire to thus register the tire against the design imparting surfaces of the mold.

Because of the fact, however, that the area between the beads of the tire is open it has long been known that in the absence of support means provided in this area that the curing bags just described will be unable to properly work since the same will merely distort into the space between the beads and thus not be effective for the purpose of providing expanding pressure as required.

To obviate such deformation it has long been known in the prior art that a collapsible curing ring of rigid nature can be positioned between the beads interiorly of the casing with this ring serving to support the curing bag against radially inward deformation that would otherwise occur. By use of such rings in combination with the mold side walls it is obvious that the expanded pressure of the curing bag would be solely limited to a radially outward expansion of the type required to drive the camelback into registry with the mold for curing purposes.

While the aforementioned structure is well known in the prior art in the performance of a recapping operation, it is nonetheless apparent that the same requires at least two separate auxiliary members in the form of a curing bag and a curing ring, and further requires the time consuming steps of positioning each of these components in place to effectuate recapping.

It has been discovered that similar results with regard to recapping can be obtained by eliminating the curing bag and curing ring and replacing the same with a pair of opposed bead plates that extend over the opposed bead openings so as to coact with the tire to form an air tight chamber.

This air tight chamber is prevented against axial side wall expansion by the mateable mold sections and, accordingly expansion can be limited to perform only in a radially outward direction.

Thus, bagless and ringless recapping operation can be achieved with the use of the improved curing plates that serve to coact with the tire to form an air tight chamber.

Production of an improved recapping press having the above advantages and construction accordingly becomes the principal object of this invention, with other objects of the invention becoming more apparent upon a reading of the following brief specification, considered and interpreted in the light of the acompanying drawings.

Figure 2:
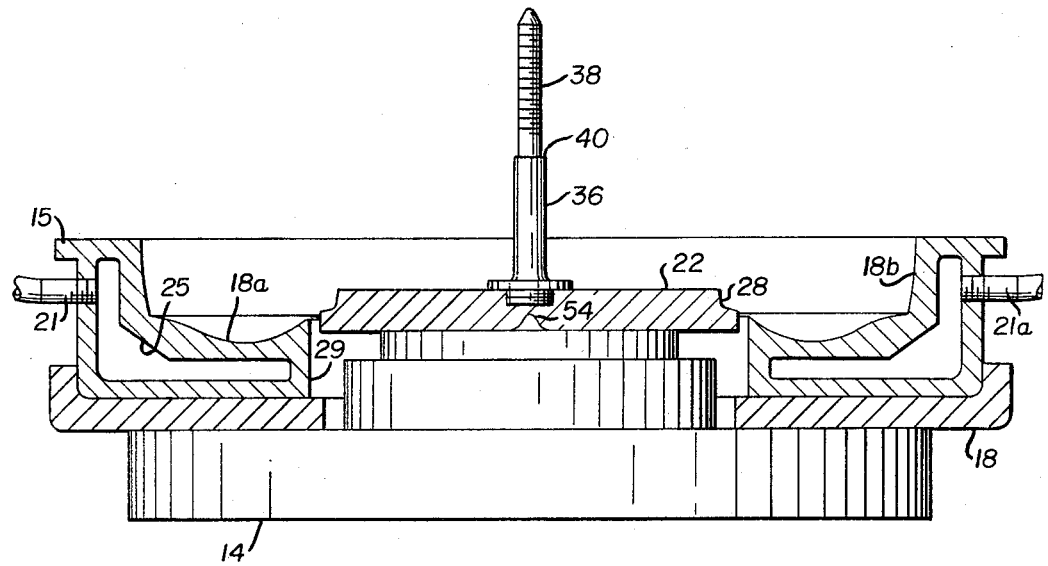
Figure 3:
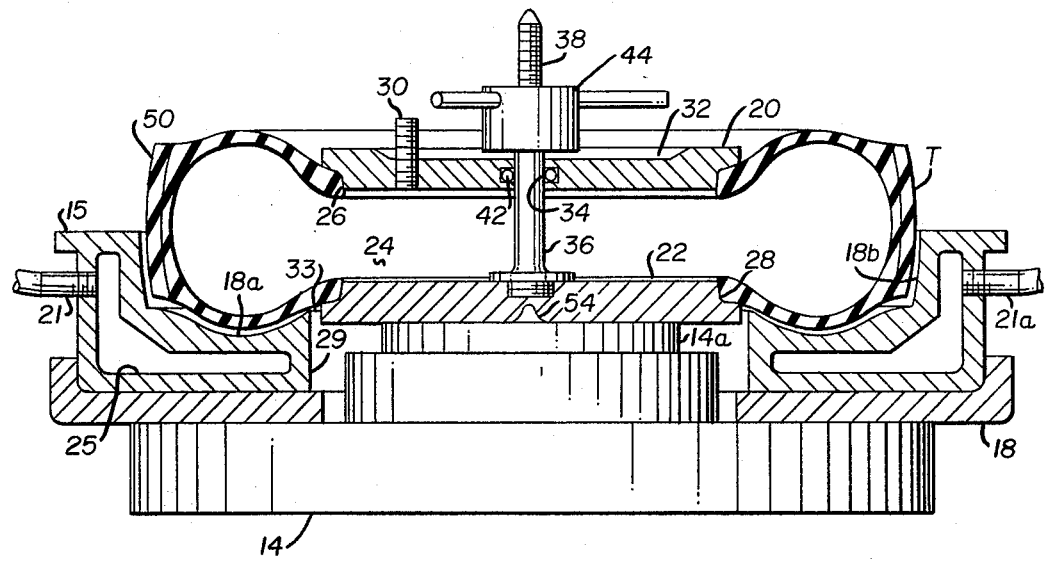
Figure 4:
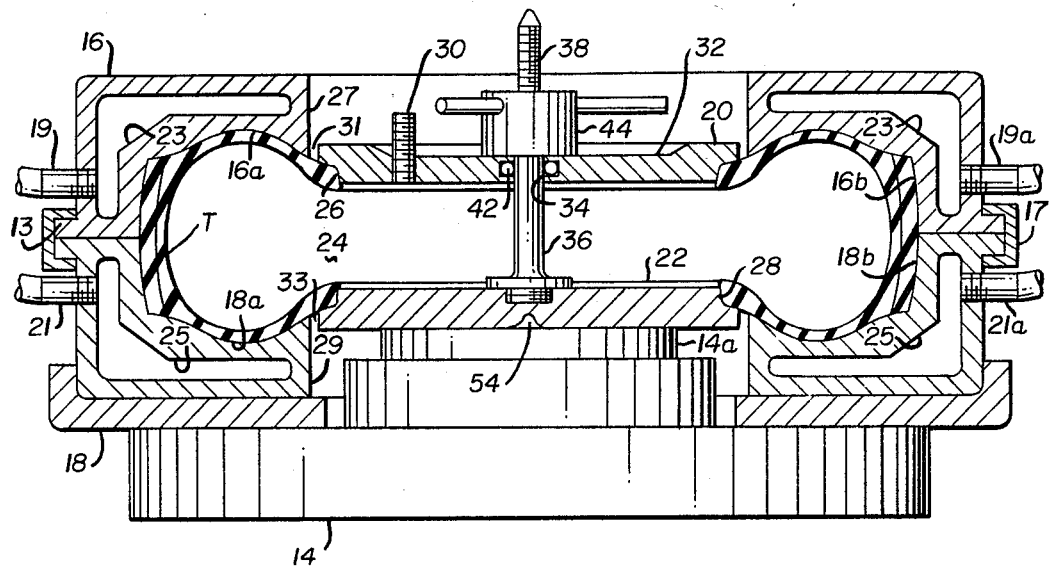
Figure 5:
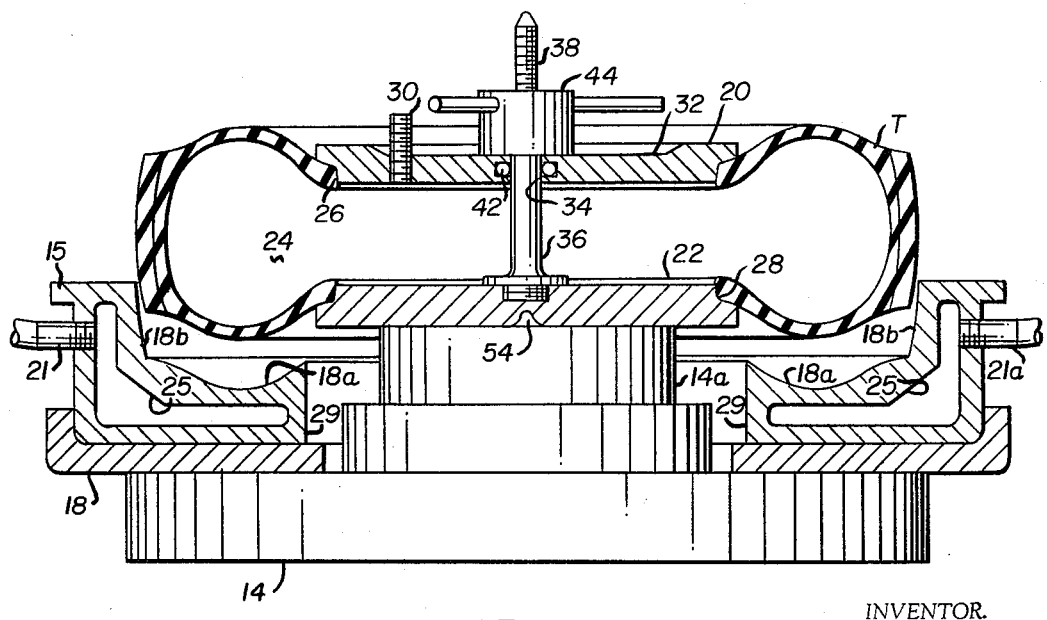

Of the drawings:
FIGURE 1 is a perspective view of the recapping tire press being partially cut away to show the positioning of a tire thereon.
FIGURE 2 is a sectional view showing the lower mold section in position to receive a tire to be recapped.
FIGURE 3 is a sectional view similar to FIGURE 2 but showing a tire positioned relative to the lower mold section.
FIGURE 4 is a view showing the upper and lower mold sections in mated condition and a tire in position for recapping.
FIGURE 5 is a sectional view showing a recapped tire being removed from the lower mold section.

Referring now to the drawings, the improved tire recapping press, generally designated by the numeral 10, includes a base stand 12 from which projects support standard 14. The standard 14 supports the relatively moveable upper and lower mold sections 16 and 18, respectively, as well as the piston 14a, with actuation of the just described component parts being accomplished through the usual control panel 11 shown schematically in FIGURE 1 of the drawings. An upper circular plate 20 and a lower circular plate 22 concentric to each other, coact with tire T in the formation of an air-tight pressure chamber 24, as will hereinafter become evident.

Upper plate 20, at its peripheral edge, is provided with a bead seat 26, with a similar bead seat 28 being provided on lower plate 22. In this manner, the plates 20 and 22 cooperate with the tire T by receiving the upper and lower bead portions of the tire T in bead seats 26 and 28, respectively, to effect a sealing off at the bead portions and permit inflation of the tire T with a pressure medium.

Upper plate 20 includes an apperture 30 for receiving a suitable pressure connecting element for introducing pressure into the cavity or chamber 24 defined by the plates 20 and 22 and the tire T. Plate 20 is otherwise formed, with the outer surface thereof having a depressed central portion 32 and an axial bore 34 to cooperate with elements carried on the lower plate 22 for purposes of positioning and locking the seated tire T relative to the mold sections, as will presently become apparent. A mounting rod 36, suitably centered and threaded into lower plate 22, has a threaded portion of reduced diameter 38 defining a shoulder 40. In this manner the upper and lower plates may be operatively positioned in respect to each other, with the bore 34 in upper plate 20 receiving the rod 36 protruding from the lower plate 22. Shoulder 40 will act as a stop limiting and aiding in achieving the desired separation between the plates 20 and 22. Appropriate bearings and seals 42 are used to facilitate and maintain the air-tight condition in the slideable union of bore 34 and rod 36. A locking block 44 is threaded onto rod portion 38 to secure the plates relative to each other and also making it possible to treat the plates, the tire T, and the chamber 24 thereby formed as a unit with respect to the mold sections 16 and 18.

The above cited capability eliminates the necessity of relatively massive mold sections. There is no need that mold sections, for example, be equipped with the necessary means for positioning and inflating a tire during vulcanization. Nor is there any need to use a bag with the necessary adaption of the mold to accommodate insertion and extraction. In fact, the needed air pressure chamber can be formed before the tire is positioned into contact with the mold sections. The structure of the mold, therefore, can be limited only to its principal function of vulcanization.

The mold sections 16 and 18, herein shown, are basically of annular or circular configuration and, when mated, enclose the entire crown and sidewall area of the tire. To this end, they are shown as having tire receiving cavities 16a and 18a, respectively, defining design imparting surfaces 16b and 18b. Projecting lip portions 13 and 15 receive a locking ring 17 for locking the mold sections 16 and 18 together during the vulcanization cycle. Apertures 19 and 21 permit reception of appropriate connections for introducing steam or other vulcanization mediums into the mold hollows 23 and 25.

The hollows 23 and 25 are limited in radial extension by interior walls 27 and 29. In this regard, the walls 27 and 29 are axially extended to provide a better enclosure through the sidewall area, as well as to narrow the axial spacing between the bead positions of the tire T. Better support and control results, since the axially extended walls 27 and 29 are opposed to the design imparting surfaces 16b and 18b to thereby aid in controlling the radial forces constantly in the direction of the design imparting surfaces. The limit in the radial extension given the hollows 23 and 25 by the walls 27 and 29 prevent and obviate any contact between the mold sections and the plates 20 and 22. Further, to this end, a spacing, as at 31 and 33, is provided to assure the transverse separation of the mold sections and the plates, as well as to provide a workable clearance for moving the plates 20 and 22 relatively of the mold sections 16 and 18.

In use and operation of the improved bagless tire recapping press, lower plate 22 is first positioned relative to lower mold section 18. To this end, a centering device, such as the protuberance 54, on support standard 14, is used to guard against the possibility of error and to assure the proper spacing between the lower plate 22 and the lower mold section 18. Mounting rod 36, carried by the lower plate 22, will, of course, reach its desired position as the lower plate 22 is positioned. Next, the tire T will then be placed into contact with lower plate 22, with its lower bead portion seated in bead seats 28. Upper plate 20, with bore 34 receiving therein the mounting rod 36, is then brought into position.

In this regard, upper plate 20 will be brought into contact with tire T so that the upper bead portion of tire T will be suitably seated in the bead seat 26, as is clearly illustrated in FIGURE 3 of the drawings. The tire T, as again evident from FIGURE 3, will have associated therewith a suitable tread stock or camelback 50 which, as is known, is to be vulcanized to the tread portion of the tire T during the recapping operation. Locking block 44 is then threaded to portion 38 of mounting rod 36 and turned until it is engaged by stop 40, thereby firmly locking the plates 20 and 22 and the tire T in potentially airtight relationship. Upper mold section 16 is then mated to lower mold section 18 and locked thereto by ring 17. Tire T is now completely enclosed within the cavity formed by the union of the mold cavities 16a and 18a, with the camelback, in close adjacency with the design imparting surfaces 16b and 18b.

A pressure medium is next introduced through aperture 30 to drive and maintain the tread, crown and sidewall portions in proper registry to the mold cavity, as is seen in FIGURE 4 of the drawings. It is merely necessary now that a suitable vulcanizing medium be introduced through the apertures 19 and 21 to be circulated throughout the mold and discharged through outlets 19a and 21a, with such circulation continued throughout the whole length of time required for a complete vulcanization cycle.

Upon completion of the vulcanizing cycle, ring 17 will be removed permitting the separation of the mateable mold sections 16 and 18.

Upper mold section 16 will be first withdrawn to allow easy access to the locking block 44, which will be unthreaded from portion 38 of rod 36 and removed. Piston 14a may be then operated to raise tire T from lower mold section 22. Upper plate 20 is then disengaged from the recapped tire T with the tire, in turn, then being separated from the lower mold section 22 to thereby clear the molding press for the reception of another tire.

It is to be noted that the assembly of the molding press can be accomplished in another manner which admits to the creation of an air-tight chamber removed from and independent of the mold press. For instance, tire T may be positioned relative to lower plate 22, with the upper plate 20 then being inserted on the rod 36 in proper association to the tire T. Locking block 44 may then be turned until engaging the stop 40 to, thereby, obtain and retain the lower plate 22, upper plate 20 and the tire T in an air-tight relationship. This unit, as above formed, may then be positioned relative to lower mold section 18. Upper mold section 16 may then be mated, as before, and the vulcanizing operation performed as described above. This method of assembly provides the advantage, if desired, of allowing the recapped tire to be removed from the heat source and permitted to cool before it is necessary to separate the upper and lower plates 20 and 22.

It will be seen from the foregoing that there has been provided a recapping molding press dispensing with the need of a vulcanization bag. Simplification of mold structure is permitted since it is not necessary to encumber the mold with the necessary means for inserting and extracting a bag. The axial separation between the bead portions of the tire when the tire is positioned for recapping can be narrowed, as it is no longer necessary to provide relatively large openings for moving a bag into and out of the interior of a tire. Narrowing by axially extending the interior wall of the mold sections permit controlling of air inflation and pressures to produce advantageous results. In this manner, air pressure is controlled, resulting in constant, continuing radially directed forces firmly registering the tire to the mold cavity during the entire recapping operation.

What is claimed is:
1. A retreading unit of the character described, comprising;
(A) support means;
(B) a lower plate of circular configuration and having
(1) peripheral bead seat
(2) a tapped aperture coincident with its axis of rotation;
(C) an elongate support rod having
(1) a threaded portion adjacent one end thereof with said threaded portion being threaded into said tapped aperture of said lower plate,
(2) having the remaining end
(a) reduced in diameter to form a shoulder
(b) being threaded;
(D) an upper support plate of circular configuration having
(1) a peripheral bead seat,
(2) a central aperture
(a) coincident with its axis of rotation,
(b) of sufficient size to be received over the larger portion of said rod in sliding relationship therewith;
(E) a locking block having a tapped aperture that is adapted to threadingly engage said reduced diameter threaded portion of said rod, whereby said block may be advanced axially of said rod toward said lower plate until said block engages said shoulder thereof;
(F) said mounting rod aligning said plates in concentric relationship with each other;
(G) inflation means carried by one said plate and adapted to inflate a pneumatic tire whose beads are seated upon the bead seats of said plate, with said locking block limiting separation of said plates during operation of said inflation means;
(H) and separable mold sections
  (1) supported by said support means,
  (2) adapted to mold and vulcanize tread stock to the periphery of said tire in its inflated position, and
  (3) being spaced radially outwardly from the periphery of said plates in tread-encircling relationship with a tire supported by said plates.

2. The device of claim 1 further characterized by the presence of locating means coacting between said support means and said lower plate and rotating said lower plate with respect to said support means.

References Cited by the Examiner

UNITED STATES PATENTS

| | | | |
|---|---|---|---|
| 2,713,382 | 7/1955 | Bosomworth et al. | 18—17 X |
| 2,835,921 | 5/1958 | White | 18—18 |
| 2,948,924 | 8/1960 | Clapp | 18—18 |
| 2,987,770 | 6/1961 | Powell | 18—18 |
| 2,989,779 | 6/1961 | White | 18—18 |
| 3,029,469 | 4/1962 | Moore et al. | 18—17 |
| 3,071,811 | 1/1963 | Herbert | 18—17 |
| 3,130,446 | 4/1964 | Duerksen | 18—18 X |

J. SPENCER OVERHOLSER, *Primary Examiner.*

J. HOWARD FLINT, Jr., *Examiner.*